US006527013B2

United States Patent
Somerville et al.

(10) Patent No.: US 6,527,013 B2
(45) Date of Patent: Mar. 4, 2003

(54) INSULATED JACKETS FOR HOT AND COLD PIPING SYSTEMS AND FOR HOT AND COLD AIR DUCTING SYSTEMS AND METHODS OF USE

(75) Inventors: Norman George Somerville, Columbia, MD (US); James Lannen Beckstrom, Parkton, MD (US); Robert Kent Nicholson, Phoenix, MD (US); Richard Bedner, Warren, NJ (US)

(73) Assignee: Horizon Resources Corporation, Sparks, MD (US)

( * ) Notice: Subject to any disclaimer, the term of this patent is extended or adjusted under 35 U.S.C. 154(b) by 127 days.

(21) Appl. No.: 09/771,400

(22) Filed: Jan. 27, 2001

(65) Prior Publication Data

US 2002/0100517 A1 Aug. 1, 2002

(51) Int. Cl.$^7$ .................................................. F16L 9/14
(52) U.S. Cl. ........................ 138/148; 138/166; 138/169; 138/DIG. 4
(58) Field of Search .............................. 138/148, 112, 138/113, 166, 169, DIG. 4

(56) References Cited

U.S. PATENT DOCUMENTS

| | | | | |
|---|---|---|---|---|
| 563,775 A | * | 7/1896 | Lantzke ...................... 138/148 |
| 1,677,714 A | * | 7/1928 | Frease ......................... 138/115 |
| 2,947,303 A | * | 8/1960 | Epstein ..................... 126/307 R |
| 3,379,221 A | * | 4/1968 | Harry et al. ................. 138/148 |
| 3,872,780 A | * | 3/1975 | Zanias .......................... 138/114 |
| 3,981,689 A | * | 9/1976 | Trelease ...................... 138/148 |
| 5,592,975 A | * | 1/1997 | Wissmann et al. ........... 138/148 |
| 6,046,404 A | * | 4/2000 | Figenschou et al. ......... 138/112 |
| 6,230,750 B1 | * | 5/2001 | Lessard et al. .............. 138/149 |

* cited by examiner

*Primary Examiner*—James Hook
(74) *Attorney, Agent, or Firm*—Albert W. Davis, Jr.

(57) ABSTRACT

The disclosure relates to a plastic jacket having air spaces formed by spaced walls used to insulate hot and cold piping systems and the fittings for those systems. The jacket is made from multiple segments, which are joined together along their longitudinal joints. The segments are joined to each other by tongue and groove connections. One segment can be cut longitudinally and glued to another segment to make a larger segment to fit various diameters of pipe. In a further embodiment, the plastic jacket is modified to form the duct of a heating, ventilating and air conditioning system. The inner wall of the jacket forms the air duct. In both embodiments, at least some of the segments have hinge portions created by omitting the inner wall at the hinge portions.

10 Claims, 9 Drawing Sheets

INSULATED JACKETS FOR HOT AND COLD PIPING SYSTEMS AND FOR HOT AND COLD AIR DUCTING SYSTEMS AND METHODS OF USE

CROSS-REFERENCE TO RELATED APPLICATIONS

In our U.S. Pat. No. 5,797,415, an insulating jacket was described for use with hot or cold fluid piping systems. The insulating jacket is of especial value on chilled water piping systems. The jacket is used on pipe sections and fittings, such as elbows, and includes thermoplastic sections, which snap together and resilient seals. In our U.S. Pat. No. 6,000,420, we described a similar insulating jacket for a hot or cold piping system having alternate embodiments for fastening and sealing the jacket around the piping system. These insulating jackets are designed to utilize one or more air gaps and to seal the fittings and pipe sections off from the surrounding ambient environment thereby providing an effective vapor barrier to prevent the migration of moisture to the cold surfaces of fittings and pipe sections and of the insulation. The disclosure of U.S. Pat. Nos. 5,797,415 and 6,000,420 to Nicholson et al for Insulating Jacket for Hot and Cold Piping Systems and Method of Use is hereby incorporated by reference into this application.

BACKGROUND OF THE INVENTION

The insulated jacket designed for use with hot and cold fluid piping systems is thoroughly discussed in the previously cross-referenced patents.

The insulated jacket as used with the air duct system is designed to carry and insulate the air for heating, ventilating and air conditioning (HVAC) systems. Many of the present HVAC systems are formed from metal ducts, which are insulated by adding fiberglass insulation after the ducting system has been installed.

Since thermoplastics are the preferred materials of construction, a number of forming methods were described in our previous applications including injection molding and extrusion. However, the expense involved in fabricating the large numbers of molds and dies required to produce insulating jackets to cover all the pipe and fitting sizes from ¼ inch to 42 inches would be prohibitive.

BRIEF SUMMARY OF THE INVENTION

It is an object of the invention to provide an insulating jacket of thermoplastic having the insulating features described in our previous patents but incorporating a latching design which permits various size insulating jackets to be formed by latching together a number of segments fabricated using only one die or mold.

To this end, an insulating jacket assembly for a pipe section has been provided which includes a number of identical flexible thermoplastic segments that snap together end to end through the use of snap and lock/latch mechanisms located along their longitudinal lengths.

To extend the jackets capability to fit all pipe sizes, a single adjustable/modified segment is provided which may be adjusted in size to connect with the other identical segments thereby permitting the insulating jacket assembly to enclose more sizes of pipe. Split gaskets and tape are used to form a seal between the junctions of each assembly.

Alternatively, an insulating jacket assembly for a fitting in a piping system, has been provided which includes a number of identical flexible thermoplastic segments and a single adjustable segment, as described above, to enclose the fitting of a piping system, such as a Tee. The jacket assembly for the fitting is formed by cutting a jacket assembly for a straight pipe and re assembling the cut sections to form a jacket assembly for the fitting. The jacket sections are joined to each other by welding or gluing. These segments snap together through the use of snap and lock mechanisms, again as described above. Split gaskets and tape are used to form a seal between each end of the fitting jacket assembly and the adjacent pipe section insulating jacket assemblies described in this application.

It is a further object of the invention to provide a pre-insulated air duct for use in fabricating the ducting in heating, ventilating and air conditioning (HVAC) systems using the same technology that was applied to the piping system.

To that end, an insulating jacket assembly has been provided to form a pre-insulated circular or rectangular air duct which includes a number of identical flexible thermoplastic segments and may include single adjustable segment, as described above, to form the duct. In this application, the flexible and the adjustable thermoplastic segments not only provide the air gap insulation but also provide the carrier pipe that transports air in a heating, ventilating and air conditioning (HVAC) system. As in the piping system applications, the segments are snapped together through the use of snap and lock mechanisms. The flexible stand-offs of the insulating piping jacket are reduced in length (for circular ductwork) or eliminated (for square ductwork) to form the inner wall of the air duct. The pre-insulated duct has at least a singular air gap to provide the insulation. Split gaskets and tape are provided to form a seal between each end of the assemblies. The elbows and tees of the air duct system can be fabricated in the same manner described for the insulating piping jacket.

BRIEF DESCRIPTION OF THE DRAWINGS

The invention will be better understood when viewed with the following drawings, wherein.

DETAILED DESCRIPTION OF THE INVENTION

Figure 1:
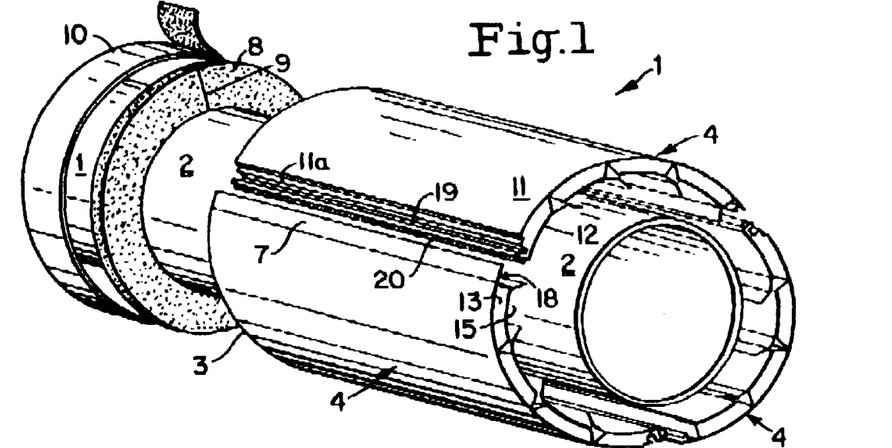
FIG. 1 is an exploded perspective view showing all the various elements of the insulating jacket assembly consisting of three identical flex segments on a pipe.

Referring now to the drawings, the reference numerals denote like elements throughout the several views. FIG. 1 is an exploded view of an installed insulating jacket assembly 1 installed on a pipe 2. At the junction of the pipe insulating jacket assembly 1 which can be connected to another pipe insulating jacket assembly 1 or fitting insulating jacket assembly is an insulating jacket joint 3 that consists of a split gasket 8 having a hole to receive the pipe 2 and sealing tape 10. A slit 9 permits the gasket to be installed on the pipe 2. The sealing tape 10 provides the seal at the junction of two insulating jacket assemblies. An appropriate tape would be 3M 4910 TM acrylic tape. Also shown are three identical extruded thermoplastic segments 4, which snap together through the use of a latch, which consists of a flap 7 containing a tongue (shown later) that is inserted in a groove (shown later). The pipe jacket assembly 1 can be made of any thermoplastic but PVC is the preferred thermoplastic in approximately 0.050-inch wall thickness. Since the preferred method of making is to extrude the segments, the thickness will vary, preferably, between 0.040–0.050 inches. Clear or translucent PVC is used where monitoring of the system is desirable. Only a portion of the jacket needs to be clear or translucent. The clear or translucent portion preferably extends longitudinally but could extend circumferentially or at an angle to the centerline of the pipe 2. Further, the clear or transparent section needs to be on only some of the insulating jacket assemblies 1 on a pipe 2, especially if they are not isolated from each other by seals such as the gasket 8. The assembly can be made up of two or more identical segments depending upon the diameter of pipe 2.

Figure 2:
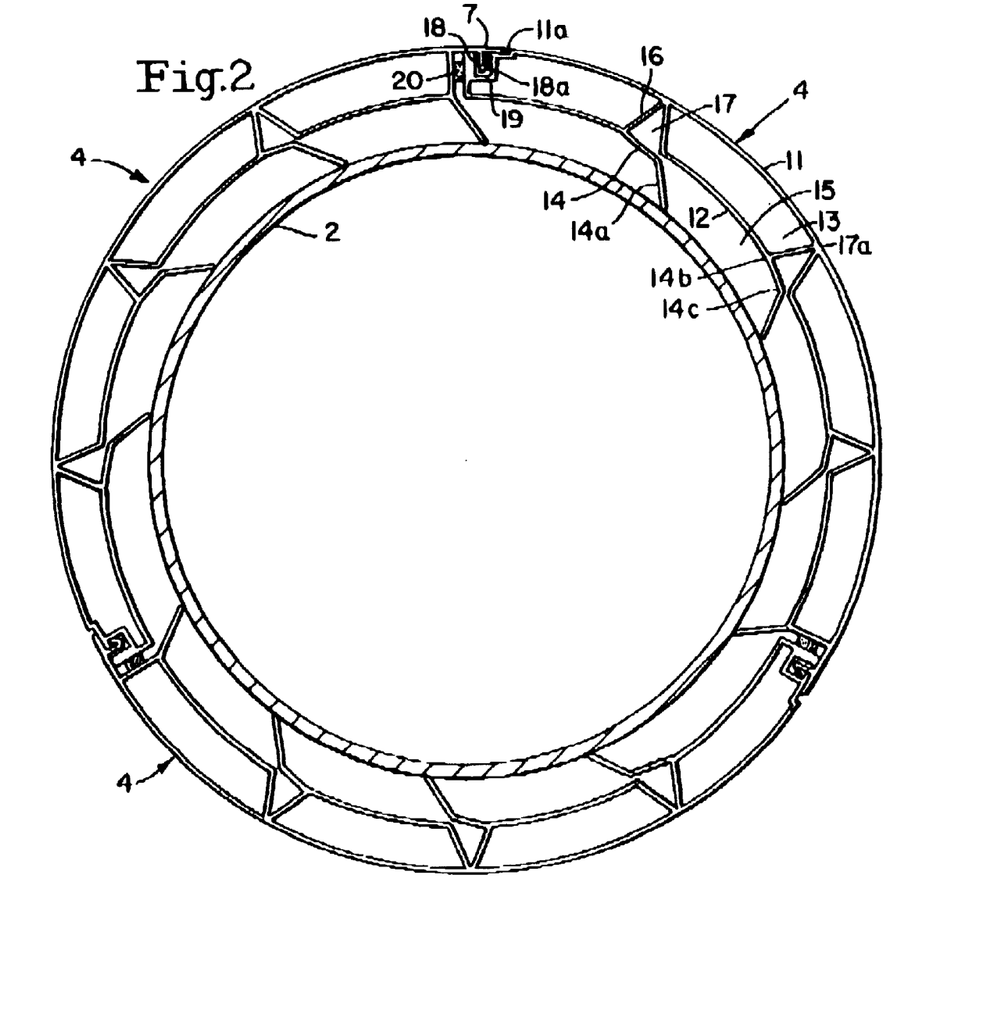
FIG. 2 is an end view of FIG. 1.
Figures 6A, 6B:
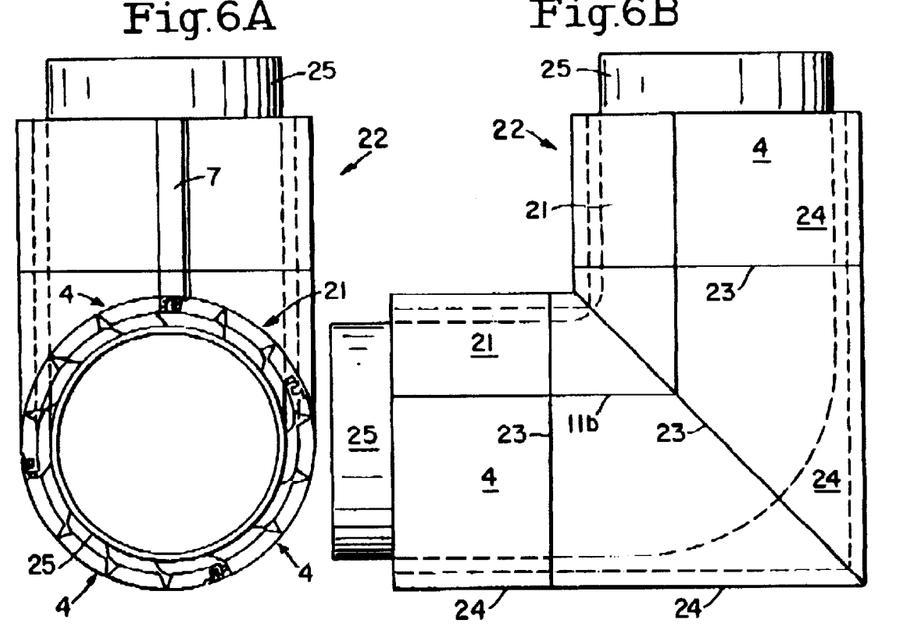
FIGS. 6A and 6B show end and side views of a short radius elbow covered with a jacket assembly consisting of three identical flex segments and an adjustable segment.

FIG. 2 is an end view of FIG. 1 showing the three identical segments 4 which snap together through the use of a latch which consists of a flap 7 containing a tongue 18 that is inserted in groove 19. This view shows the three segments enclosing the pipe 2 with the relative orientation of the outer 11 and the inner 12 jacket assembly walls that produce the insulating properties. This pipe jacket assembly is similar to the jacket assembly described in our U.S. Pat. No. 6,000,420 but differs from that assembly in that it incorporates flexible fingers 14 with an angled end portions 14a as stand-offs or spacers to hold the inner wall 12 of the jacket off of the pipe 2 instead of the more rigid stand-offs or spacers described in the first jacket assembly. The flexible fingers 14 provide the inner air gap 15 between the inner wall 12 and the pipe 2 and their flexibility permits the jacket segments 4 to enclose pipe having small variances in diameter. The spacers 16 between outer wall 11 and inner wall 12 form two sides of a triangle 17 without a bottom leg and produce the outer air gap 13. The apex 17a of the triangle functions as a "live" hinge. The fingers 14 produce the inner gap 15 and provide a movable bottom leg for the triangle 17. The triangle 17, which has a movable bottom leg, formed by finger 14, permits the outer wall 11 to flex as a "live" hinge. Of course, a different material of the proper flexibility could be co-extruded at 17a to form the hinge. As shown in FIG. 3A, the flexibility of the fingers 14 can be increased by reducing the thickness of the fingers 14 at root portion 14b and connecting portion 14c. For example, the fingers 14 can have a thickness of 0.050 inches with the root portion 14b and the connecting portion 14c having thickness of 0.030 and 0.040 inches respectively. By making the root portion 14b thinner than the connecting portion 14c, the finger 14 will close off the triangle 17 before reaching its final installed position. The end view also shows how the three flexible jacket segments 4 interlock together as tongue 18 on flap 7 fits in groove 19. Seal 20 seals at the junctions between adjacent segments 4. Seal 20 can be made of an elastomeric, flexible material or of strips of a flexible material such as ALCRYN TM, which can be co-extruded (shown in FIGS. 13 and 14). Tongue 18 in groove 19 and seal 20 seal the jacket along its longitudinal joints. However, if only one is used to form a seal or neither is used to form a seal, tape could be added later to form a seal along the longitudinal joint between one segment and the next segment. Where there are more than three segments forming the circumference, the latches 7 of some of the adjoining segments may be glued down, taped over or just preassembled to form "halves" or pieces which can be more easily handled in the field as shown in FIG. 6A.

Figure 3:
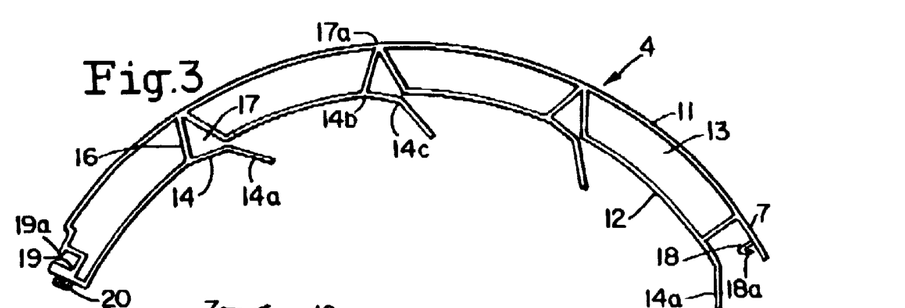
FIG. 3 is an end view of an individual flex segment.
Figures 3A, 4, 5:
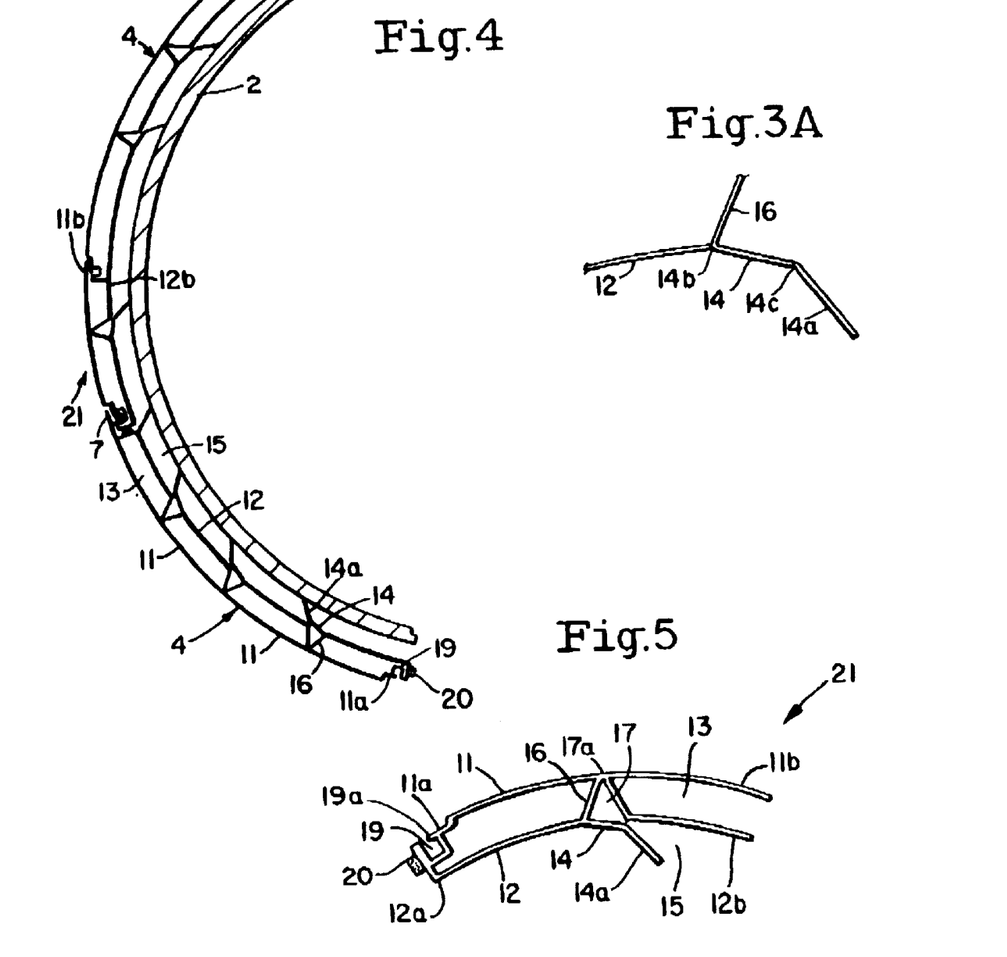
FIG. 3A is an enlarged end view of the finger/spacer and part of the jacket wall
FIG. 4 is a partial end view of a pipe jacket assembly consisting of two flex segments of equal length and an adjustable segment installed on a pipe section.
FIG. 5 is an end view of an adjustable segment.

FIG. 3 shows an end view of an individual flex segment 4 in greater detail. The segment is extruded with a curvature. It shows more clearly the flap 7 with its tongue 18 with a barb 18a which fits into groove 19 with a lip 19a of a connecting identical flex segment and the seal 20. The flexible fingers 14 with angled end portions 14a; root portions 14b and connecting portions 14c and spacers 16 are also shown in greater detail. The barb 18a and the lip 19a serve to releasably lock the longitudinally extending joint under the flap 7 together. The angled end portion 14a serves to contact the pipe 2 to space the jacket from the pipe thereby forming the inner air gap 15.

FIG. 4 shows a partial end view of a pipe jacket assembly showing two of four. identical flex segments 4 and an adjustable segment 21. This view shows how the jacket assembly can be enlarged to enclose a larger pipe section (or fitting section). The adjustable segment 21 is created by taking a flex segment 4 and cutting off a portion. The adjustable segment 21 and another flex segment 4 are then joined to form a larger segment 4,21 which than can be snapped to the other flex segments 4 to form the jacket assembly 1. The joining of the cut end or ends 11b, 12b of the adjustable segment 21 to flex segment 4 can be done by using PVC glue, for example. The swab that applies the PVC glue can usually coat both walls 11b, 12b by running a swab carrying the glue between them. Walls 11b, 12b are then slid over the end 11a, 11b (FIG. 5) of the adjacent segment having the groove 19 and held in place until the glue cures. A flex segment 4 is cut down to the appropriate length to create the adjustable segment 21 prior to joining it to the flex segment 4.

FIG. 5 shows an end view of an adjustable segment 21. The right end 11b, 12b of a flex segment 4 is cut down in size to accommodate the circumference of the pipe (or fitting) that the pipe jacket assembly 1 is covering to form the adjustable segment 12. Then, a portion of this end 11b or 12b is glued to the other end 11a, 12a of adjacent flex segment 4 to form the larger segment 4, 21 that allows the jacket to fit larger pipe diameters than that which would be possible by only using flex segments 4. If desired, the adjustable segment can be extruded from a separate die with the spacing between the walls 11, 12 being increased by the thickness of the walls 11, 12, such a 0.100 inches for 0.050-inch walls.

FIG. 6A and FIG. 6B show the end view and the side view of the insulating jacket assembly used on a fitting, such as a short radius elbow 25. The short radius elbow jacket 22 is formed by assembling segments 4, and 21 if needed. The fitting jacket 22 is manufactured by cutting up pieces/sections of a pipe jacket section 1. The assembled segments 4 of a length of the pipe insulating jacket assembly 1 has a cylinder of foam of the appropriate size inserted into the jacket assembly to expand the jacket assembly to its maximum circumference which will hold the assembly taut. Then, the jacket assembly 1 is cut along lines which will form sections 24 which will be joined along seams 23 to form the fitting, a short radius elbow. The cuts can be made using a fitting saw, which is a band saw on a movable, miter tabletop that is mounted on ball bearings. A cylinder of foam of the appropriate size is placed in the jacket assembly 1 to hold the assembled segments 4 in proper alignment during the cutting process. The cut sections 24 can be joined to each other by hot air welding or by gluing using adhesives. An acceptable glue is 3M JET MELT ADHESIVE 3792 LM TM. Flex segments 4, and adjustable segment 21 where needed, are snapped together around the elbow 25 in a manner similar to their installation around a pipe. The four sections 24 make up each half of the jacket, as shown in the side view. The segments 4, 21 can be reassembled to form two halves. The halves can be formed by gluing down latch 7 onto wall end 11a, taping over the latch 7 and wall end 11a or by merely placing tongue 18 in groove 19 thereby joining one segment 4 to the next segment 4.

Figures 7A, 7B:
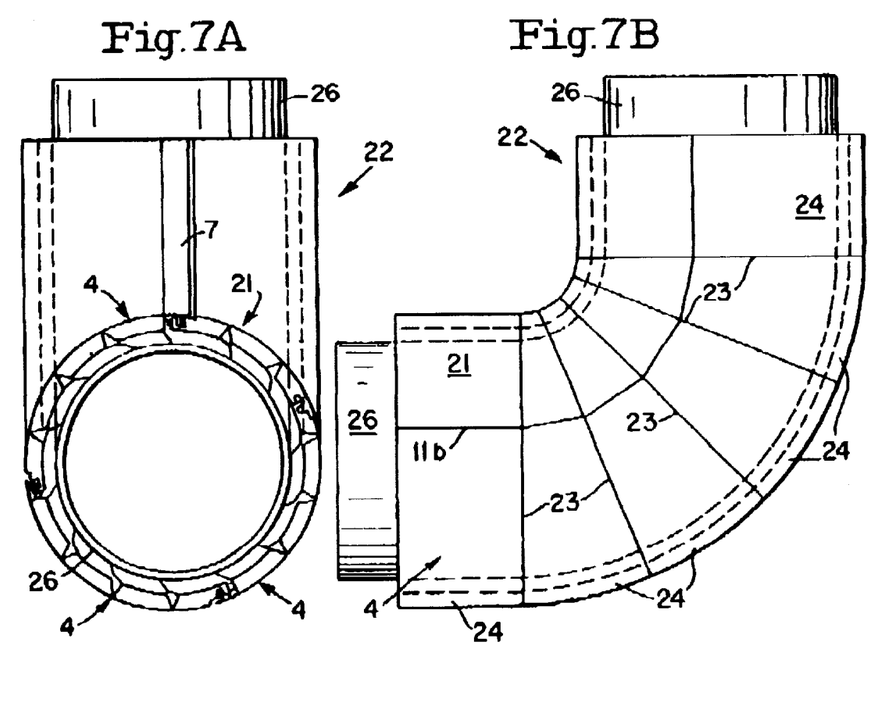
FIGS. 7A and 7B show end and side views of a long radius elbow covered with a jacket assembly consisting of three identical flex segments and an adjustable segment.

FIG. 7A and FIG. 7B show the end view and side view of the flex system used for a long radius elbow 26. Flex segments 4, and adjustable segment 21 if needed, are snapped together around elbow 26 in a manner similar to their installation around the short radius elbow 25. The latch 7 may be opened and closed at the top and bottom of the elbow. The six sections 24 make up each half of the jacket, as shown in the side view.

Figure 8A:
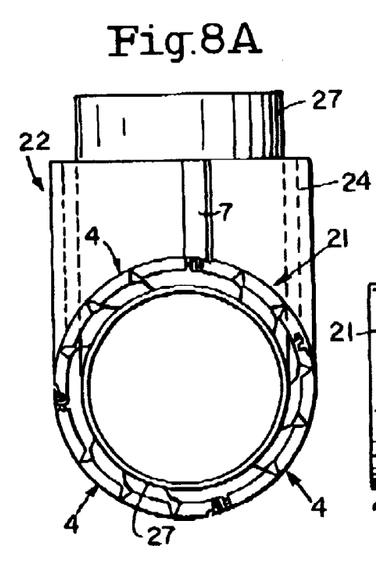
FIGS. 8A and 8B show end and side views of a tee covered with a jacket assembly consisting of three identical flex segments and an adjustable segment.
Figure 8B:
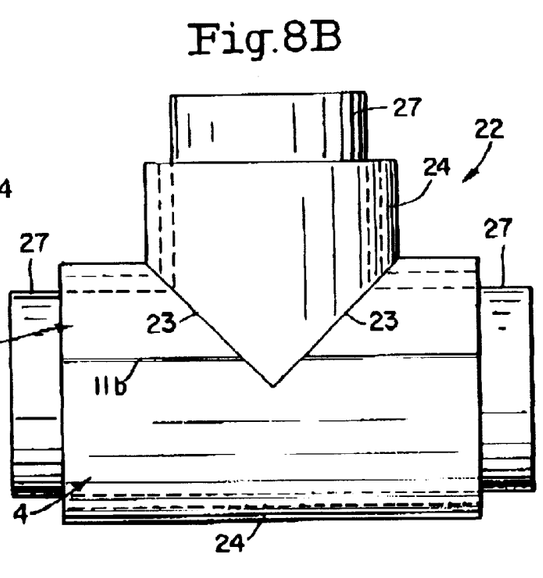

FIG. 8A and FIG. 8B show the end view and side view of the insulated fitting jacket 22 used for a tee 27. Flexible segments 4 and adjustable segment 21 are snapped together around the tee 27 in a manner similar to their installation around the elbows. The latches 7 may be opened and closed at the top and bottom of the tee. The three sections 24 make up each half of the jacket, as shown in the side view.

Figures 9A, 9B:
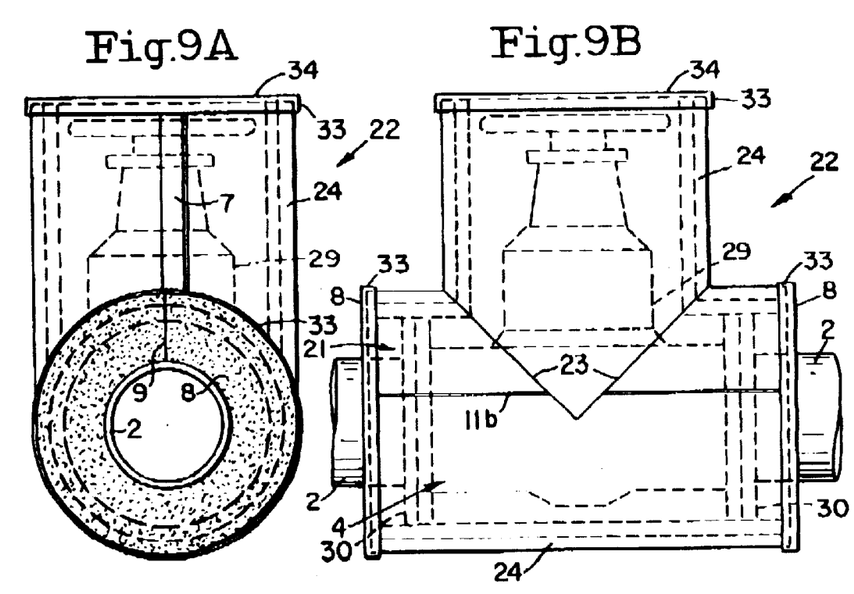
FIGS. 9A and 9B show end and side views of a flanged gate valve covered with a jacket assembly consisting of three identical flex segments and an adjustable segment.

FIG. 9A and FIG. 9B show the end view and side view of the flex system used on a flanged gate valve 29. Flexible segments 4 and adjustable segment 21 are snapped together around the valve in a manner similar to their installation around the tee. Similar to the jacket assembly around the tee, the section 24 covering the bonnet having a protruding V-shaped cut may be glued at the seams 23 to the other section 24 having an inverted V-shaped cut. As with the body of the valve, the bonnet may be enclosed with multiple flex segments 4. The latch 7 may be opened and closed at the top and bottom of the valve. Also, since the valve body flange 30 exceeds the diameter of the pipe 2, the ends of the valve body jacket section must be sealed with split gaskets 8, so that the air space between the valve body jacket and the pipe 2 are sealed from the surrounding environment. Tape 33 seals the junctions of the valve body jacket 22 and the gaskets 8. The tape or a caulk may also be used at the junction of the gaskets 8 and the pipe 2. Similarly, the top of the section 24 on the valve bonnet should also be sealed with a solid gasket 34 so that the air space between the valve bonnet jacket, which encloses the valve bonnet and handle, is sealed from the surrounding environment. Tape 33 seals the junction at the valve bonnet section 24 and the gasket 34. Gasket 34 is similar to gasket 8 except it has no hole for the pipe or slit for mounting.

Figures 10, 11:
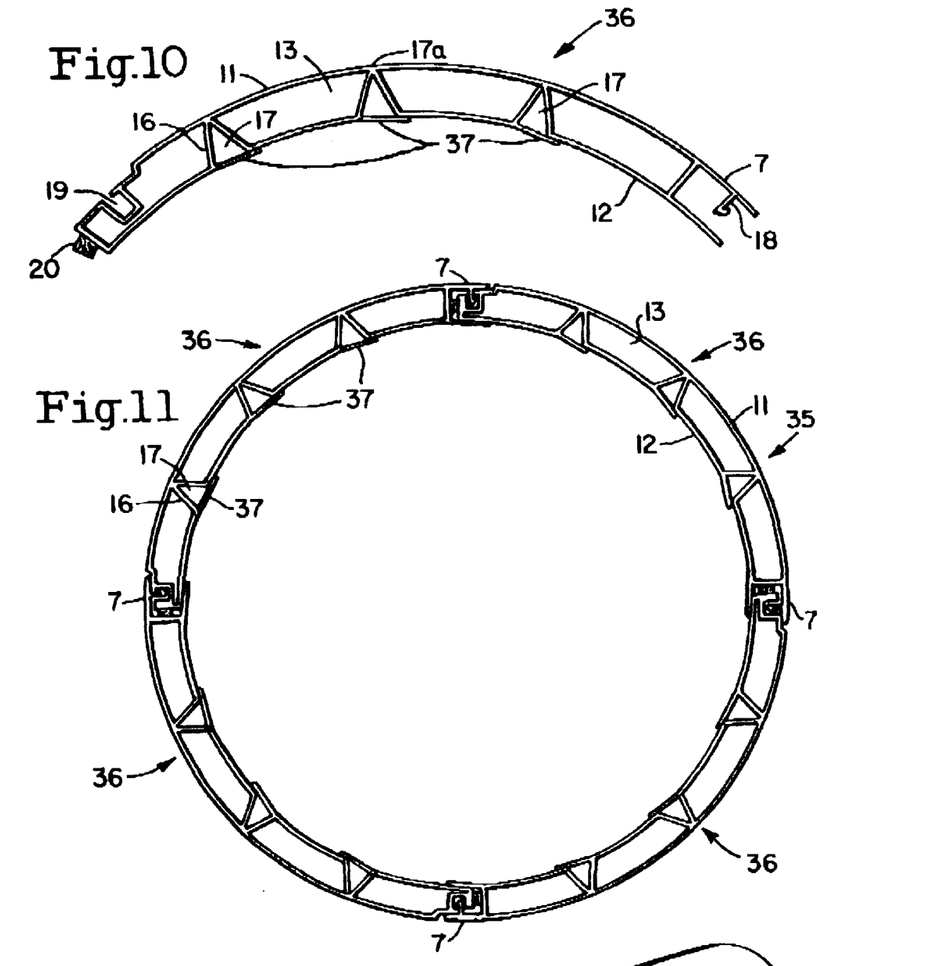
FIG. 10 is an end view of an individual flex segment for use in a different application. This segment is modified to create both an inner wall, which acts as an air carrier duct of a HVAC system and a single air gap to provide the insulation for the circular air carrier duct.
FIG. 11 is an end view of the multiple flex segments snapped together to produce a circular air duct.

FIG. 10 shows the end view of a modified flex segment 36 being used in a different application. The segment 36 is modified to form a section of an insulated circular air duct 35. The legs 37 are free to move relative to the wall 12, close the triangles 17 and create a portion of the inner wall 12 of the air carrier duct 35 of the HVAC system. The legs 37, like fingers 14, seal off the triangular portion 17 of the air gap 13 to provide insulation. Multiple flex segments 36 may be latched together to form a section of pre-insulated, circular air duct 35. The thickness of the wall segments 36 can be of the same order of magnitude as that of segments 4. The segments 36 can also be extruded from PVC plastic.

FIG. 11 shows an end view of four joined segments 36 forming an insulated circular duct 35. These segments 36 are latched together in a manner similar to those in FIG. 2, that is, by using tongue 18 having barb 18A and groove 19 having lip 19A. As in FIG. 4, an adjustable segment, like segment 21, can be used with segments 36 where the segments 36 are not sufficient to create the duct size. The adjustable segment for the air duct would be created and joined as disclosed previously.

Figure 12:
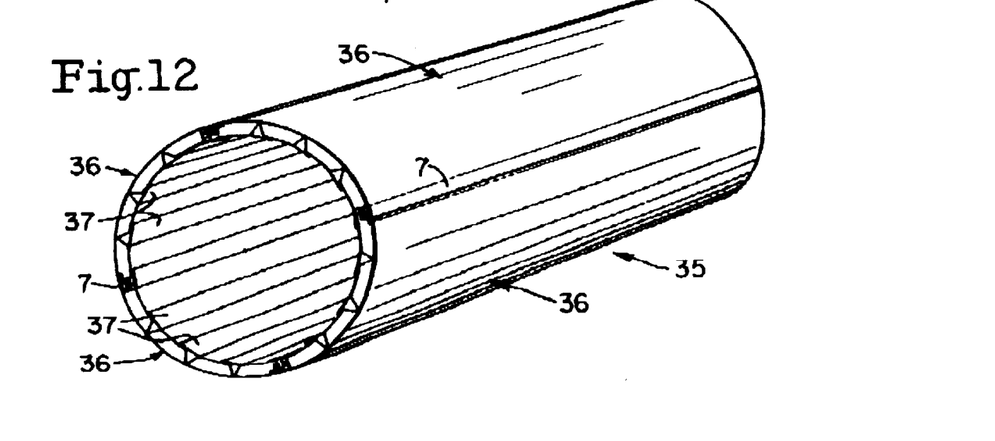
FIG. 12 is a perspective view of the multiple flex segments snapped together to form the circular duct section of FIG. 11.

FIG. 12 shows a perspective view of four joined segments 36 forming an insulated circular duct section 35. One duct section 35 can be assembled with other duct sections 35 by the use of gaskets and tape in the same method that is used in FIG. 1. Only in this instance, the gasket would have a central hole that would match the size of the inner wall 12 of the duct 35. Alternatively, the gasket can be omitted, and the duct sections 35 can be merely taped to each other to form a run of ducting. The duct sections can be supported by the conventional duct hangers or other support devices.

Figures 13, 13A:
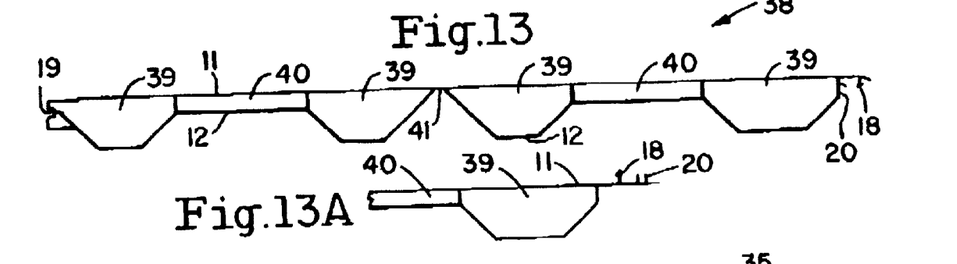
FIG. 13 is an end view of another design of an individual segment, which may be used to create both an inner wall to act as an air carrier pipe and a single air gap to provide the insulation for use on a square duct.
FIG. 13A is a partial end view of the segment of FIG. 13 modified to form the duct of FIG. 18.

FIG. 13 shows an end view of another embodiment of the air duct flex segment 38 which can be used for square insulated HVAC ducting 35. The segment 38 consists of reinforced sections 39 and center sections 40. Segments 38 have a groove 19 in the side of the segment. Tongue 18 located at one end of the segment 38 is designed to fit inside groove 19 of another segment 38. ALCRYN TM strips 20 can be used to provide a seal at the latch.

Figures 17, 18:
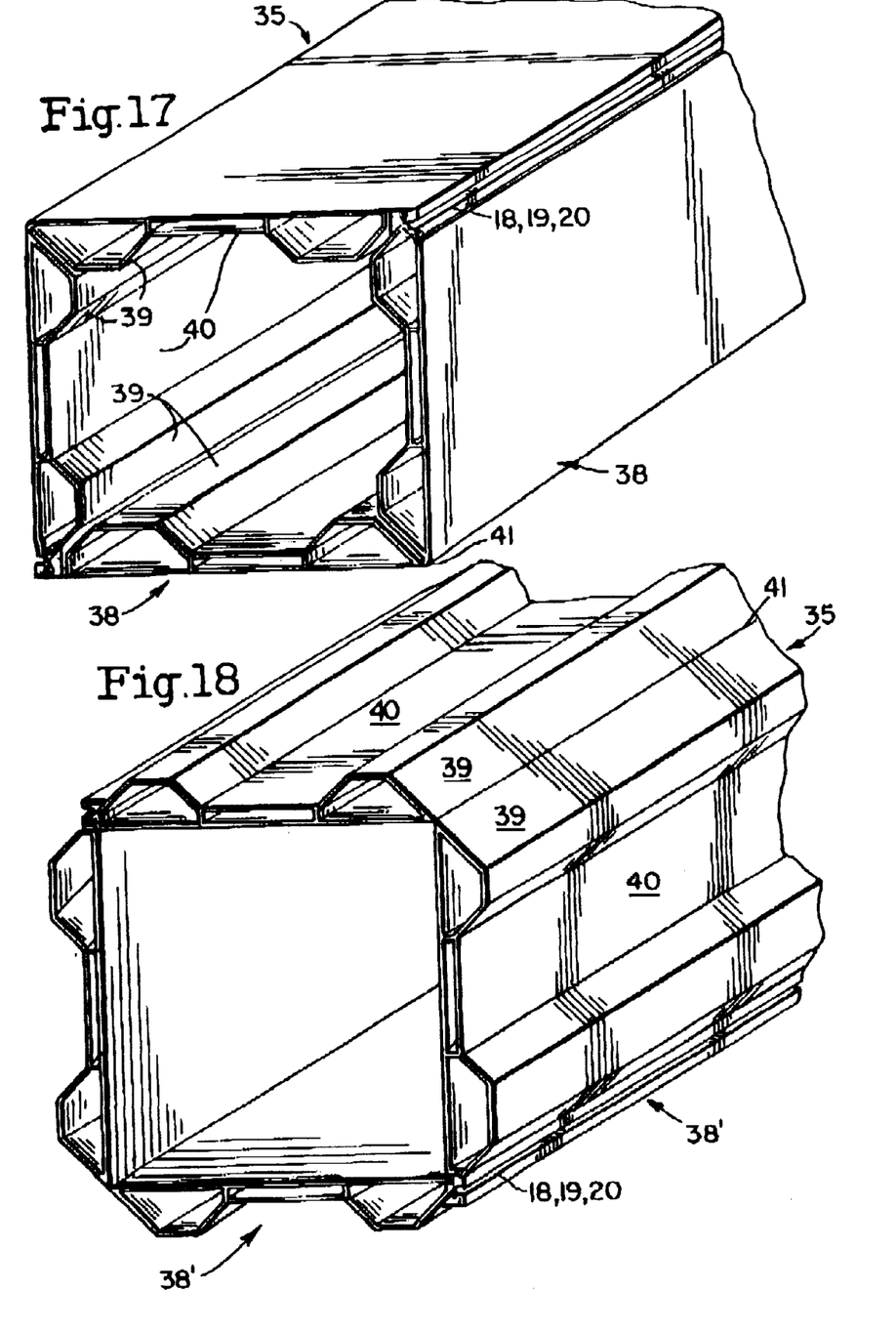
FIG. 17 is a perspective view of two segments snapped together to form a 9-inch×9-inch square duct (reinforcement inside).
FIG. 18 is a perspective view of multiple segments snapped together to form a 9-inch×9-inch square duct (reinforcement outside).

FIG. 13A shows an end view of the segment 38 of FIG. 13, which has been modified to form the duct of FIG. 18. In this modification, tongue 18 is formed on the outer wall 11 which will become the inner wall in the configuration of FIG. 18. The seal 20 formed by ALCRYN ™ strips is moved from reinforced section 39 to wall 11. The strips 20 will seal against the wall that contains groove 19.

Figure 14:
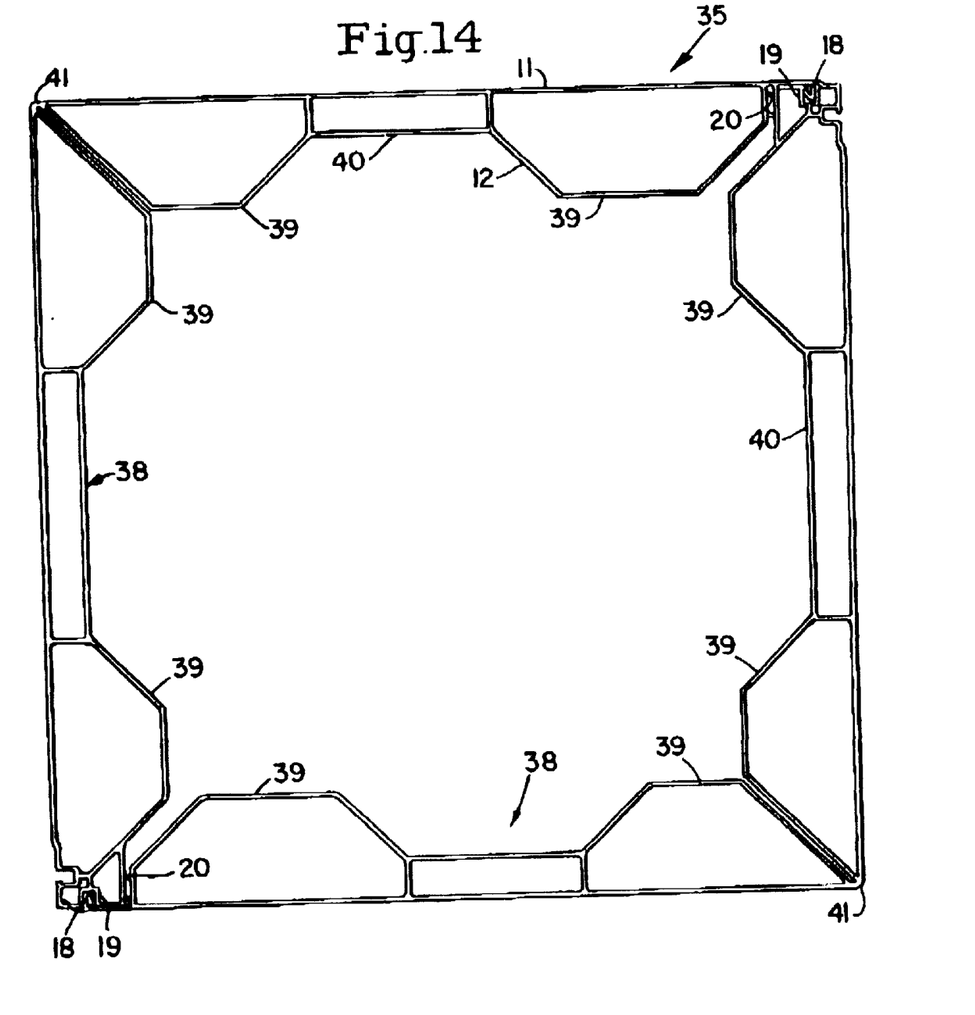
FIG. 14 is an end view of a 9-inch×9-inch square duct formed from two segments shown in FIG. 13 snapped together.

FIG. 14 shows an end view of two flex segments 38 joined together to form a 9×9-inch square insulated duct section 35. The center 41 of each flex segment 38 located between the two reinforced portions 39 of these segments has a thickness of 0.050 inches and is flexible and therefore can bend on a 90° angle. FIG. 14 shows the two segments bent on 90° angles, joined, and latched at two corners by inserting tongues 18 in grooves 19. The strips 20 also help provide seals at the latch.

Figure 15:
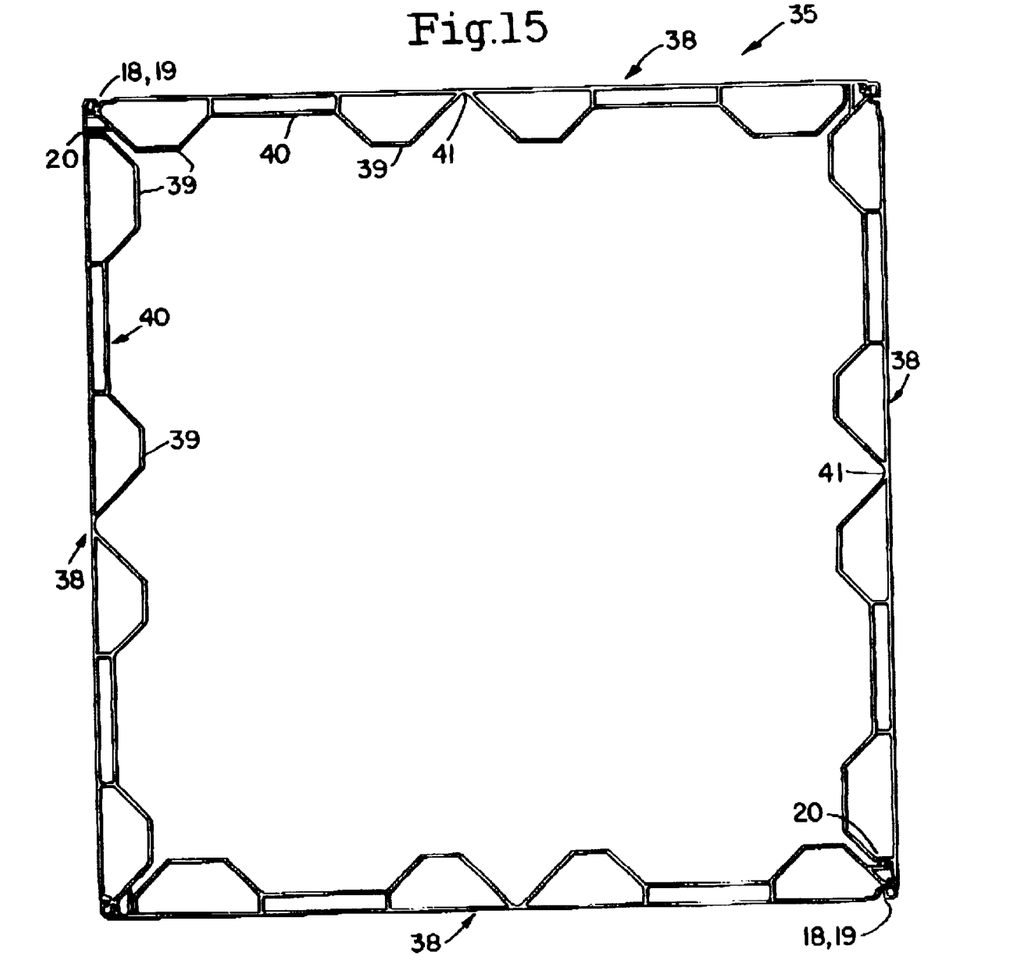
FIG. 15 is an end view of an 18-inch×18-inch square duct formed from four segments shown in FIG. 13 snapped together.

FIG. 15 shows an end view of four segments 38 joined together to form an 18×18-inch square insulated duct section 35. For this duct section, the individual segments 38 are not bent on 90° angles and are assembled in their straight configuration. The segments 38 are joined at each corner by inserting the tongue 18 of one segment into the groove 19 of the other. The strips 20 help provide a seal at the corners.

Figure 16:
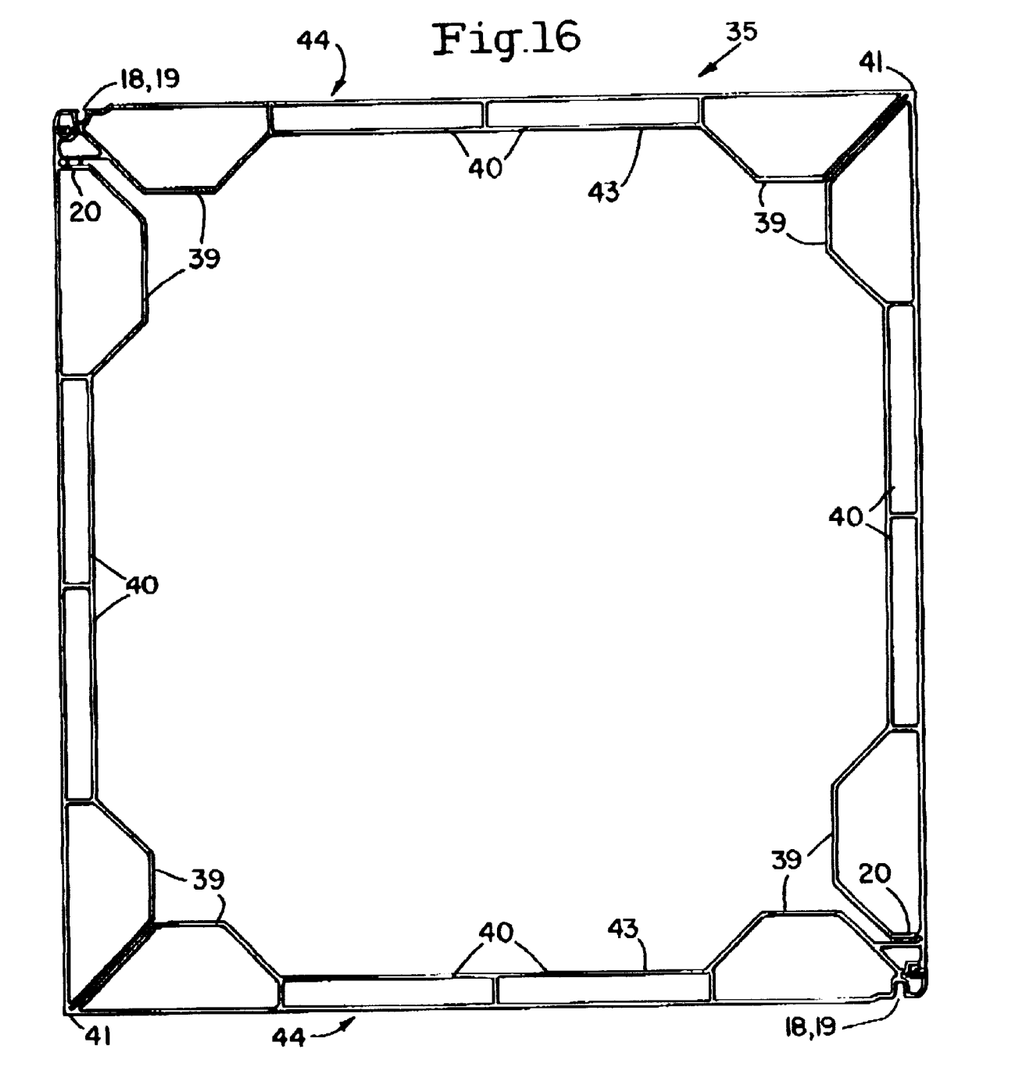
FIG. 16 is an end view of another design of individual segments snapped together to form 12-inch×12-inch duct.

FIG. 16 shows the end view of a 12×12-inch square insulated duct section 35 which incorporates two flex segments 44 having a slightly different design from flex segment 38. The center portions 40 of each segment are doubled in length. Each segment 44 is bent at 90° angles in the center 41 and joined and sealed at two corners by inserting tongues 18 in grooves 19 in a manner similar to that shown in the 9×9-inch insulated square duct section. The strips 20 help provide a seal at the corners.

FIG. 17 is a perspective view of the duct section 35 of FIG. 14 showing multiple flex segments snapped together to form a 9×9-inch insulated square duct section. The FIGS. 14, 15, 16 and 17 show the reinforced corners on the inside of the duct. However, the segment corners could be bent 90° in the opposite direction so that the reinforcement 39 at the corners of the duct 35 is on the outside and the flat surfaces on the inside as shown in FIG. 18.

As an example of the relative dimensions of a segment for piping insulating jacket, the outer circumferential length from end of latch 7 to the end of seal 20 is 10⅝ inches, and the outer circumference from the tongue to the groove is 9⅞ inches. The outer air gap/space 13 is ⅜ inches thick and 2¼ inches on the outside by 1⅞ inches on the inside. The standoff is ⅜ inches on the triangle leg portion and ⅜ inches on the angled end portion. The longitudinal length of the segment is 3 feet.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

What is claimed is:

1. A method of heat insulating a duct of a heating or cooling air distribution system comprising the following steps, providing a heating or cooling system for heating or cooling air, providing ducts to carry the heated or cooled air from the heating or cooling system to rooms, providing an insulation system formed by a thin jacket made from plastic material as part of the duct, forming the jacket from an inner wall, an outer wall and spacers connecting and spacing the inner and outer walls, the inner wall forming the duct which carries the heated or cooled air, choosing the jacket material thickness such that the insulation value of the jacket material is insignificant relative to the overall insulation value of the insulation system, forming an air space around the duct by the use of the outer wall and spacers within the jacket abutting the duct to allow for the formation and maintenance of an air space between the outer wall and the duct, the air space forming substantially all of the insulation value of the insulation system, omitting other kinds of solid insulation from the air space, forming the jacket from longitudinally extending segments, joining the segments to each other along longitudinally extending joints, and sealing the longitudinally extending joints.

2. The method of claim 1 wherein, a longitudinal segment has an area that acts as a hinge, the hinge is created by omitting the inner wall at a portion of the segment.

3. The method of claim 2 wherein, the spacers forming two legs of a triangle at the hinge and the third leg of the triangle being formed by a leg, which is connected to the inner wall only at one end of the leg.

4. The method of claim 3 wherein, the other end portion of the leg covering the open portion of the triangle and being movable relative to the inner wall.

5. The method of claim 1 wherein, the duct being rectangular and the spacers at the hinge being at an angle of 45 degrees.

6. The method of claim 5 wherein, the inner wall, the outer wall and spacers forming a truncated pyramid in portions of the jacket.

7. The method of claim 6 wherein, the inner wall, the outer wall and the spacers forming rectangles in portions between the truncated pyramids.

8. The method of claim 6 wherein, the truncated pyramid faces outward thereby being out of the airflow.

9. The method of claim 1 wherein, at least two of the segments have the same circumferential extent, providing a segment of different circumferential extent and joining the segment of different circumferential extent to one of the segments of the same circumferential extent thereby creating a jacket of variable size.

10. The method of claim 9 wherein, the segment of different circumferential extent is formed by cutting a segment of the same circumferential extent.

* * * * *